(12) United States Patent
Kessler et al.

(10) Patent No.: US 9,667,087 B2
(45) Date of Patent: May 30, 2017

(54) SWITCHABLE ENERGY STORAGE DEVICE AND METHOD FOR OPERATING A SWITCHABLE ENERGY STORAGE DEVICE

(71) Applicant: Robert Bosch GmbH, Stuttgart (DE)

(72) Inventors: Martin Kessler, Schwaebisch Gmuend (DE); Erik Weissenborn, Stuttgart (DE); Peter Feuerstack, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 14/421,011

(22) PCT Filed: Jul. 4, 2013

(86) PCT No.: PCT/EP2013/064162
§ 371 (c)(1),
(2) Date: Feb. 11, 2015

(87) PCT Pub. No.: WO2014/026801
PCT Pub. Date: Feb. 20, 2014

(65) Prior Publication Data
US 2015/0222140 A1    Aug. 6, 2015

(30) Foreign Application Priority Data
Aug. 14, 2012  (DE) ........................ 10 2012 214 446

(51) Int. Cl.
H01M 10/46    (2006.01)
H02J 7/02    (2016.01)
(Continued)

(52) U.S. Cl.
CPC .............. *H02J 7/025* (2013.01); *B60L 8/003* (2013.01); *B60L 11/182* (2013.01);
(Continued)

(58) Field of Classification Search
CPC . H02J 7/0011; H02J 7/0024; H02J 2007/0059
(Continued)

(56) References Cited

U.S. PATENT DOCUMENTS 3,628,087 A * 12/1971 Wigert .................. H02M 3/137
  315/151
5,767,660 A    6/1998  Schmidt
2013/0221878 A1  8/2013  Feuerstack et al.

FOREIGN PATENT DOCUMENTS

DE    102010041059    3/2012
JP    H06283210 A    10/1994
(Continued)

OTHER PUBLICATIONS

International Search Report for Application No. PCT/EP2013/064162 dated Sep. 25, 2013 (English Translation, 2 pages).

*Primary Examiner* — Edward Tso
(74) *Attorney, Agent, or Firm* — Michael Best & Friedrich LLP

(57) ABSTRACT

Switchable energy storage device (10), having: —at least two energy storage modules (1) connected in series, wherein each energy storage module (1) comprises at least one electrical energy storage cell (3) which can be connected into an operating current circuit by means of a semiconductor switch (2), characterized in that the energy storage device (10) has an electrically isolated, inductive coupling device (5) for charging the energy storage cells (3).

16 Claims, 3 Drawing Sheets

(51) Int. Cl.
*H02J 5/00* (2016.01)
*B60L 8/00* (2006.01)
*B60L 11/18* (2006.01)
*H02J 7/00* (2006.01)

(52) U.S. Cl.
CPC ....... *B60L 11/1803* (2013.01); *B60L 11/1833* (2013.01); *B60L 11/1864* (2013.01); *B60L 11/1868* (2013.01); *H02J 5/005* (2013.01); *H02J 7/0052* (2013.01); *Y02T 10/7005* (2013.01); *Y02T 10/7061* (2013.01); *Y02T 10/7066* (2013.01); *Y02T 10/7072* (2013.01); *Y02T 10/7083* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC .................. 320/107, 108, 116, 139, 141
See application file for complete search history.

(56) References Cited

FOREIGN PATENT DOCUMENTS

| | | |
|---|---|---|
| JP | 2002315109 A | 10/2002 |
| JP | 2003219582 A | 7/2003 |
| WO | 9921241 | 4/1999 |

\* cited by examiner

SWITCHABLE ENERGY STORAGE DEVICE AND METHOD FOR OPERATING A SWITCHABLE ENERGY STORAGE DEVICE

BACKGROUND OF THE INVENTION

The invention relates to a switchable energy storage device and to a method for operating a switchable energy storage device.

Power electronics systems which are intended both for use in stationary applications (for example in wind turbines) and in vehicles (for example hybrid and electric vehicles) and which combine new battery technologies with known electrical drive technologies are known from the prior art. Such systems comprise, for example, a pulse-controlled inverter, with which an electric machine (for example a rotating-field machine) is fed in terms of energy. A typical such system is a DC link, via which a battery is connected to a DC voltage side of the inverter. In order that the battery can provide the required power and energy data, individual battery cells are connected in series and sometimes additionally in parallel.

DE 10 2010 041 059 A1 discloses a method for setting a setpoint output voltage of an energy supply branch of a controllable energy store which is used for controlling and supplying electrical energy to an n-phase electric machine, where n≥1. In this case, the controllable energy store has n parallel energy supply branches, which each have at least two series-connected energy storage modules, which each comprise at least one electrical energy storage cell comprising an associated controllable coupling unit. The energy storage modules are connected firstly to a reference rail and secondly to in each case one phase of the electric machine.

SUMMARY OF THE INVENTION

The invention, in accordance with a first aspect, provides a switchable energy storage device, comprising:
at least two series-connected energy storage modules, wherein each energy storage module comprises at least one electrical energy storage cell which is connectable into an operating circuit by means of a semiconductor switch. The energy storage device is characterized by the fact that the energy storage device has a galvanically isolated, inductive coupling device for charging the energy storage cells.

In accordance with a second aspect, the present invention provides a method for operating a switchable energy storage device comprising at least two series-connected energy storage modules, wherein each energy storage module comprises at least one electrical energy storage cell which can be connected into an operating circuit by means of a semiconductor switch, wherein the energy storage device has a galvanically isolated, inductive coupling device, said method comprising the following steps:
impressing an AC electrical signal onto a primary winding of the coupling device; and
switching the semiconductor switches, arranged on a secondary side of the coupling device, of the energy storage modules in such a way that at least half-cycles of the secondary-side AC signal are used for charging the energy storage cells of the energy storage modules.

A preferred embodiment of the energy storage device is characterized by the fact that the coupling device is in the form of a transformer. This provides the advantage that a primary-side feed, by virtue of the transformer principle, effects an electrical charge variable for the energy storage cells. As regards the configuration of the primary-side energy source, there is a large amount of scope in terms of design.

A further preferred embodiment of the energy storage device is characterized by the fact that a primary winding of the transformer is arranged permanently or removably on an inductance in the operating circuit of the energy storage device. As a result, an already existing secondary winding of the transformer can be used in the form of an inductor during normal operation of the energy storage device, whereas the primary side of the transformer is used exclusively during charging operation of the energy storage device. It is conceivable for a second winding to be applied to an already existing inductance in an operating circuit of the energy supply device for implementing the transformer. In systems without an already existing inductance, in each case a complete transformer would need to be arranged in the operating circuit for the charging operation.

A preferred embodiment of the energy storage device is characterized by the fact that the semiconductor switches of the energy storage modules perform a rectifying function for the charging current. This provides the advantage that it is possible to be saved the need for a rectifier functionality for the charger since this is already in existence in the energy storage device. The charger can therefore advantageously have a technically simpler and thus less expensive configuration.

A preferred embodiment of the energy storage device is characterized by the fact that the semiconductor switches are arranged in the form of a half-bridge or a full-bridge. In this way, in each case at least half-cycles or the complete AC signals can be used for charging the electrical energy storage cells by virtue of a configuration of a circuit arrangement of the semiconductor switches.

A preferred embodiment of the energy storage device is characterized by the fact that the energy storage device has a variable number of parallel-connected strings comprising series-connected energy storage modules. Advantageously, in this way the energy storage device can be extended by strings in modular fashion.

An advantageous development of the energy storage device is characterized by the fact that a series inductance is provided for each of the strings. Advantageously, a current limitation measure for the energy storage device is thus provided which assists the parallel connection of the strings with substantially unequal electrical voltages.

A preferred embodiment of the energy storage device is characterized by the fact that the inductance is in the form of line inductance of the string or in the form of an additional discrete inductance. As a result, advantageously different possibilities for implementing the inductance are provided.

A preferred embodiment of the energy storage device is characterized by the fact that a primary winding of the coupling device is arranged so as to be spaced apart from the secondary winding of the coupling device separated by an air gap. Advantageously, this enables wireless charging of the battery cells.

An advantageous development of the method according to the invention envisages that for the case where no DC link voltage of a capacitor is required during charging, the current is conducted past the capacitor of the energy storage device by means of an actuation device. As a result, the capacitor is protected to the extent that no $I^2R$ losses occur at said capacitor, as a result of which a more favorable design of the capacitor is advantageously assisted.

A particularly advantageous feature of the invention is considered to be the fact that, in accordance with the invention, an already existing inductance of the energy storage device or of the battery direct converter is converted or altered to form a transformer, as a result of which inductive charging of electrical energy storage cells is assisted in a simple manner. For example, during normal traveling operation, a primary side of the transformer can remain open, whereas during charging operation the transformer is supplied on the primary side in terms of energy. One functionality of a charger is already provided to a large extent by the battery direct converter so that, as a result, a more simply designed charger can be used for charging the energy storage cells.

BRIEF DESCRIPTION OF THE DRAWINGS

Further features and advantages of the present invention will be explained below on the basis of embodiments with reference to the figures. In this case, all of the features described or illustrated on their own or in any desired combination form the subject matter of the invention, irrespective of the way they are summarized in the patent claims or the back-referencing thereof, and independently of their wording or representation in the description or the figures. The figures are primarily intended to illustrate the principles which are essential to the invention and should not necessarily be understood to be circuit diagrams which provide accurate details. In the figures, the same reference symbols denote identical or functionally identical elements.

DETAILED DESCRIPTION

Figure 1:
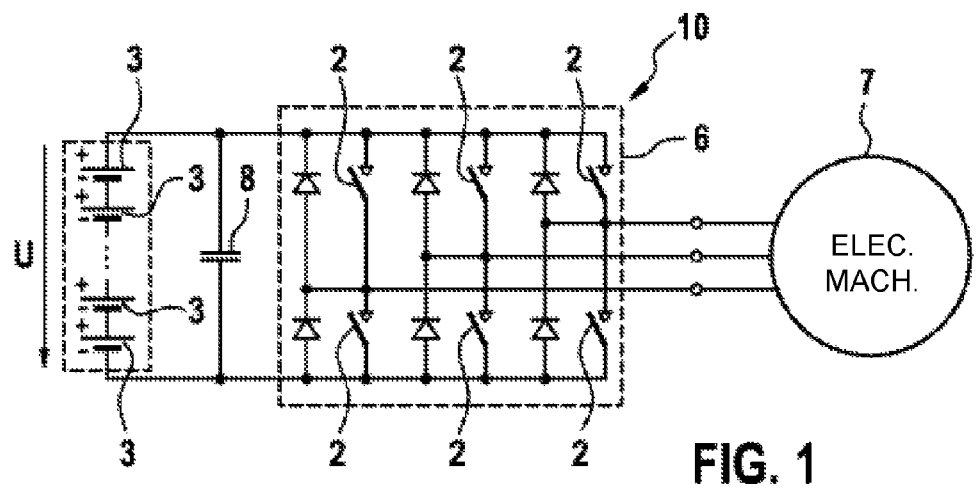
FIG. 1 shows a basic illustration of a switchable electrical energy storage device for actuating an electric machine in accordance with the prior art.

FIG. 1 shows a basic illustration of a conventional switchable energy storage device 10. In this case, a plurality of electrical energy storage cells 3 (for example rechargeable battery cells) are connected in series, with the total output voltage U thereof being buffer-stored by a capacitor 8 of a DC link. An electronic actuation device 6, which is preferably in the form of a pulse-controlled inverter, is provided in order to generate two phases for a three-phase electric machine 7 (rotating field machine) by alternately opening and closing the semiconductor switches. In order that the battery can provide the required power and energy data, individual energy storage cells 3 are sometimes also additionally connected in parallel. A charger (not illustrated) provided for charging the energy storage cells 3 needs to be able to cover the entire voltage range of the total battery, therefore.

Figure 2:
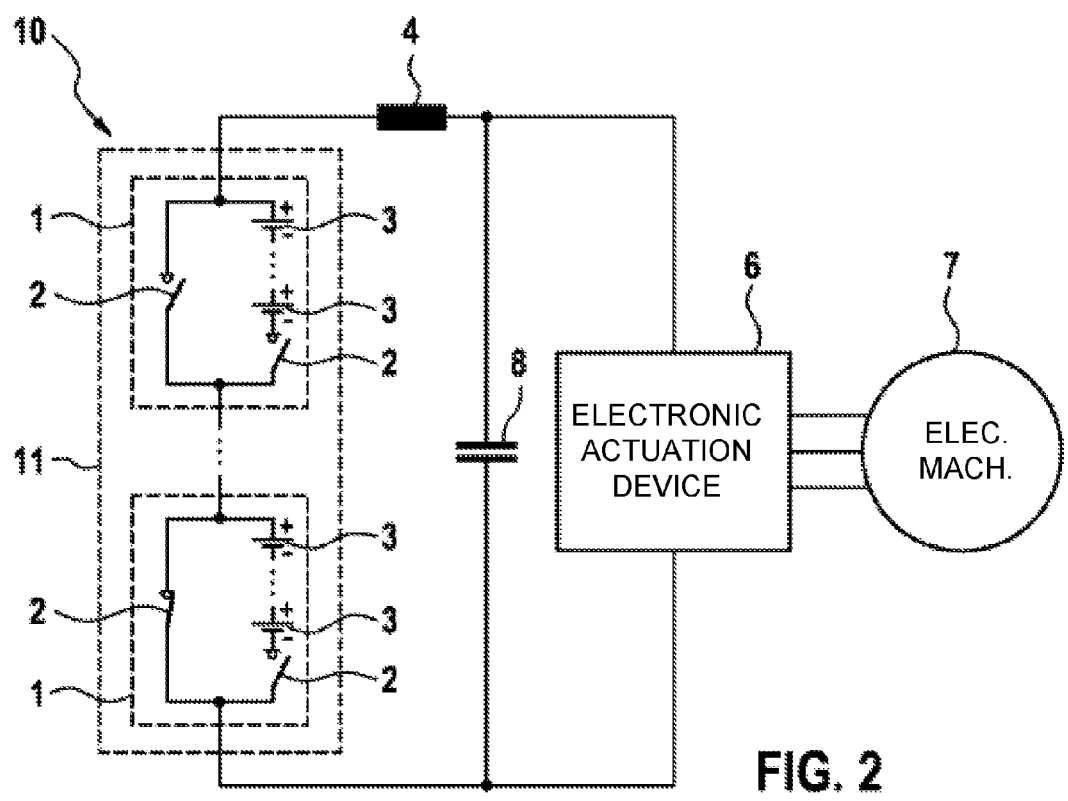
FIG. 2 shows a basic illustration of a further switchable electrical energy storage device for actuating an electric machine.

FIG. 2 shows another embodiment of a controllable or switchable energy storage device 10 in the form of a single-string battery direct converter, which can be used for actuating, in terms of energy, an electric machine. The energy storage device 10 has at least one string 11, in which two energy storage modules 1 are connected in series. Each of the energy storage modules 1 has electrical energy storage cells 3, which can be connected into an operating circuit by means of semiconductor switches 2. As a result, a variable voltage can be provided as output voltage of the energy storage device 10 by means of varying the switching operations for the semiconductor switches 2.

A current driven by the output voltage flows via an inductance 4, which is preferably in the form of an inductor which is dimensioned for high powers, wherein the inductance 4 is provided for current limitation for a capacitor 8. The capacitor 8 is provided in order to enable clocked operation of the energy storage device 10. In this case, the output voltage of the energy storage device 10 is supplied to an electronic actuation device 6 (for example a PWM (pulse-width-modulated) inverter). The actuation device 6 generates three phase voltages for an electric machine 7.

In accordance with the invention, provision is now made for the inductance 4 to be converted or modified in such a way that, as a result, inductive charging of the energy storage cells 3 within the energy storage modules 1 is made possible.

Figure 3A:
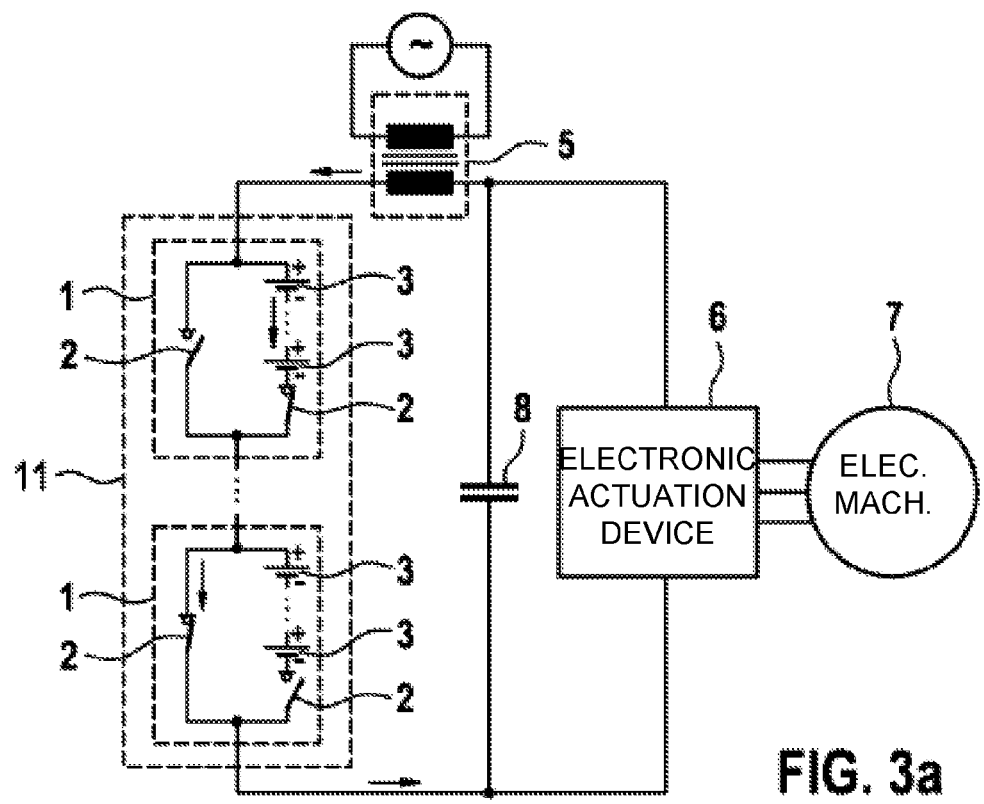
FIG. 3a shows a basic illustration of a first embodiment of the switchable energy storage device according to the invention in one phase of a charging operation.

For this purpose, as can be seen from FIG. 3a, the inductance 4 is provided with a second winding, as a result of which a coupling device 5 is provided which represents a transformer comprising two circuits which are galvanically isolated from one another. A primary side of the coupling device 5 can be used for coupling an AC electrical source. In this case, a wide variety of various sources is conceivable for the AC signal source on the primary side. The inductance 4 is therefore coupled magnetically to a further winding so that, depending on the turns number, transformer-based interaction between the two windings results. In the text which follows, the winding on which the energy source is fitted is referred to as "primary side" and the winding which is galvanically connected to the operating circuit of the electrical energy storage device 10 of the coupling device 5 is referred to as "secondary side".

A charging operation is illustrated by way of example for an AC source with a sinusoidal output variable in FIG. 3a. During a positive half-cycle, the current flows into the energy storage cells 3 to be charged or past the energy storage cells 3 not to be charged, as shown in FIG. 3a. A direction of the charging current is indicated by means of arrows. In this case, the circuit is closed either via the capacitor 8 or via diodes (not illustrated) of the electronic actuation device 6. A total output voltage of a string 11 is determined by the externally controllable switching state of the semiconductor switches 2 at the individual energy storage modules 1 and can be set in stepped fashion. A stepped configuration of the output voltage results from the voltage of the individual modules. The maximum possible total voltage results from the module voltage multiplied by the energy storage modules 1 provided per string 11.

If, during the charging operation, no DC link voltage of the capacitor 8 is required, it is also possible for all of the semiconductor switches 2 in the half-bridges of the energy storage modules 1 to be turned on in order thus to implement a low-resistance current path so as to increase efficiency. In this way, the capacitor 8 can be configured advantageously so as to have a lower power capacity and therefore to be less expensive.

Figure 3B:
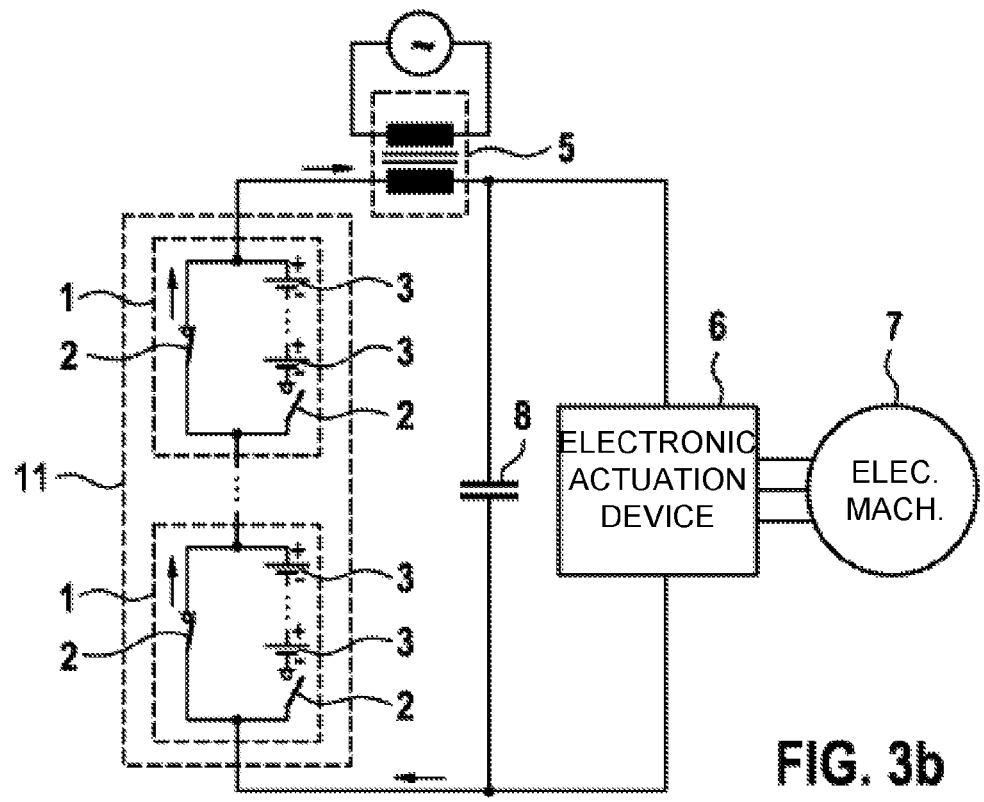
FIG. 3b shows a basic illustration of the first embodiment of the switchable energy storage device according to the invention in a further phase of the charging operation.

The charging operation for the negative half-cycle of the charging current is shown in FIG. 3b, wherein a current flow direction is indicated by arrows. In this case, the current is conducted past all energy storage cells 3 of the energy storage modules 1. The circuit is also closed here via the capacitor 8 or via the diodes of the actuation device 6. In the first case, the capacitor 8 is charged and the additional charging is output to the string 11 on the next positive half-cycle so that an average DC link voltage remains substantially constant. If the actuation device 6 is used as low-resistance current path for both half-cycles, there is no participation of the capacitor 8 and therefore no associated AC loading of the capacitor 8. Therefore, this variant is also suitable for a switchable energy storage device 10 without a DC link capacitor 8.

Although FIGS. 3a and 3b show a system with a commutating, i.e. clocked actuation device 6 with a capacitor 8 required for this, the invention can also be applied to a non-commutating operating mode of the energy storage device 10. In the second case, the capacitor 8 is not provided and therefore there is also no need for an inductance 4 for current limiting during normal (traveling) operation. As a result, during charging operation of the energy storage device 10, complete provision of the coupling device 5 according to the invention and not only provision of the inductance 4 with a primary winding is necessary.

The AC source illustrated in FIGS. 3a and 3b on the primary side of the coupling device 5 can be extended by a wide variety of DC/AC converter types (half-bridges, full-bridges, etc.), which enable energy transmission from a DC source via the coupling device 5. In this case, the DC source is representative of a wide variety of feeding energy sources such as, for example, a solar cell, a 14V battery, etc.

Likewise, there is no restriction to current sources on the primary side of the coupling device 5 either. In this case, AC voltage sources could also be used, in which case the charging current can be set via regulation of an amplitude or a duty factor on the primary side.

Owing to the galvanic isolation provided by the coupling device 5 according to the invention and owing to the transformer-based coupling, the energy storage device 10 is therefore advantageously adaptable in a very flexible manner to different primary sides. In addition, energy storage devices 10 with a wide variety of module voltages can be charged, for example, using standardized primary-side energy sources. The primary side of the coupling device 5 can alternatively also be located locally outside the energy storage device 10. It is conceivable, for example, for the primary side to be arranged at a defined spacing from the secondary side, as a result of which the so-called "inductive charging" or "wireless charging" of electric vehicles is made possible.

In this embodiment, the primary winding of the transformer is located at a certain spacing from the secondary winding/inductor of the charging circuit, separated by an air gap. As a result, the inductor or inductance 4 of the energy storage device 10 can also be used as receiver coil during wireless charging (for example resonant charging of electric or hybrid vehicles). The semiconductor switches 2 of the energy storage modules 1 also in this case perform the function of rectification, with the result that the electrical energy storage device 10 also comprises the secondary side of a "wireless charging" system.

A single energy storage module 1 has been charged by way of example on the basis of FIGS. 3a and 3b. The energy storage modules 1 to be charged can of course also be varied, however, in order to thus compensate for loading and/or heat generation and/or a state of charge. Therefore, for example, energy storage devices 10 of different sizes (for example relating to the number of cells, the maximum voltage, etc.) can be charged using a constant, possibly standardized AC variable source.

The invention is advantageously also not restricted to the previously shown half-bridges of the energy storage modules 1 formed with semiconductor switches 2. All of the previously described embodiments can also be operated using full-bridges. As a result, advantageously both the positive and the negative half-cycles can be used for charging the energy storage modules 1.

Figure 4:
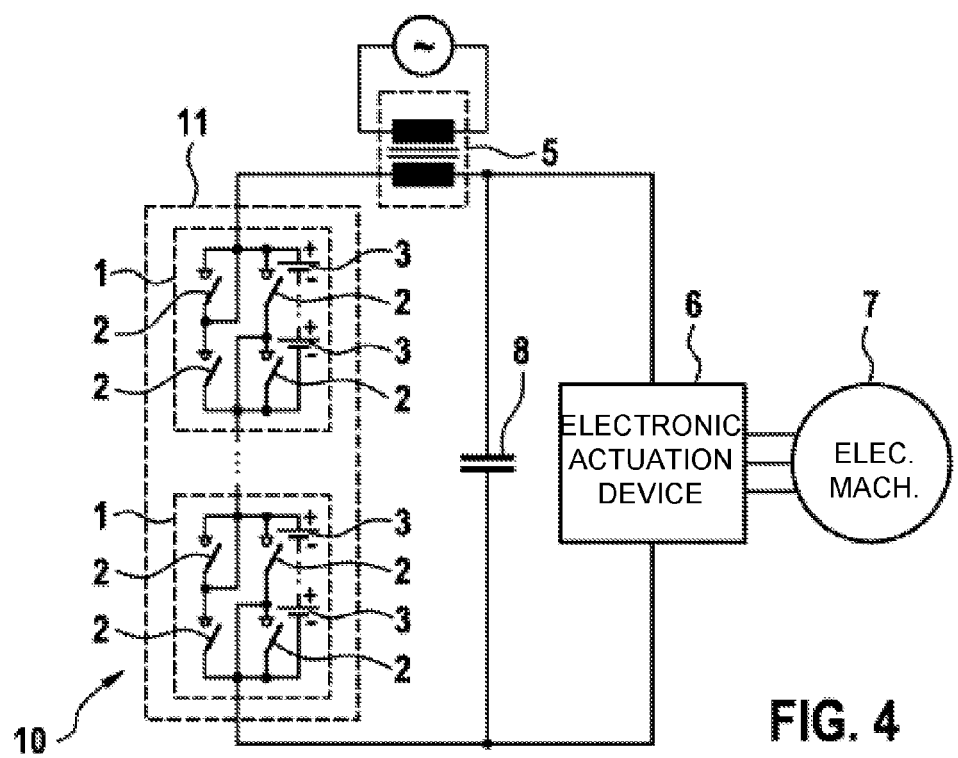
FIG. 4 shows a basic illustration of a further embodiment of the switchable energy storage device according to the invention.

FIG. 4 shows a basic illustration of such a system. Depending on the desired electrical DC voltage across the string 11 of the battery direct converter, energy storage modules 1 can be connected into the charging circuit independently of one another. Depending on the position of the semiconductor switches 2 in the full-bridge, an energy storage module 1 is bypassed or is charged by a positive and/or negative half-cycle. For improved clarity, all of the semiconductor switches 2 are illustrated in the open state in the energy storage modules 1 in FIG. 4.

Figure 5:
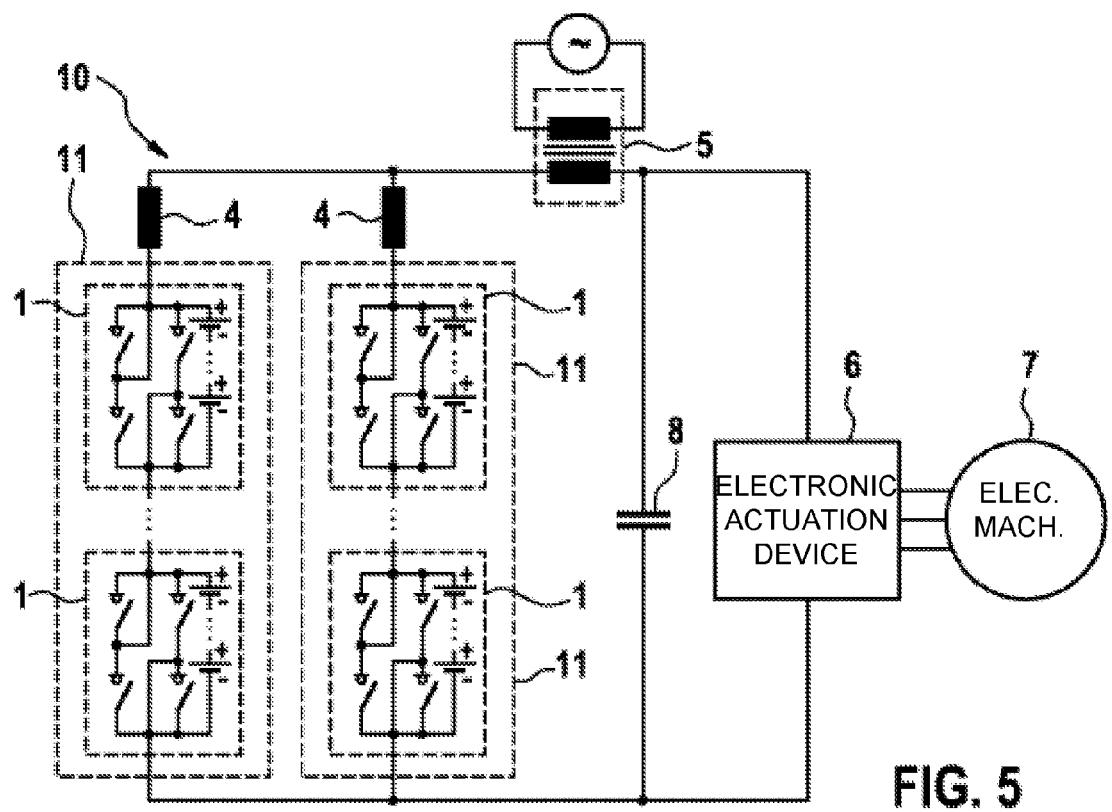
FIG. 5 shows a basic illustration of a further embodiment of the switchable energy storage device according to the invention.

As can be seen from FIG. 5, the invention is also not restricted to a single string 11, but can also be extended to any desired number of parallel-connected strings 11, which can advantageously be charged simultaneously and individually. By way of example, FIG. 5 shows a system comprising two parallel strings 11. For reasons of improved clarity, the individual elements within the energy storage modules 1 have not been provided with reference symbols here. Splitting of the total charging current between the individual strings 11 can be set by a ratio of the energy storage modules 1 connected per string 11. For a parallel circuit of strings 11, series inductances 4 which can result from the design and wiring of the strings 11 or can be realized via additional inductors, are taken into consideration for the individual strings 11.

One implementation of the method according to the invention for charging the energy storage cells 3 of the energy storage modules 1 of the energy storage device 10 can take place, for example, in the form of a computer program product, wherein the computer program product can run as hardware or software, for example, on a control device (not illustrated).

By way of summary, the present invention proposes a method and a device with which inductive charging of energy storage cells of a battery direct converter is advantageously possible in a simple manner. In this case, functionalities of a charger are already implemented for the most part within the battery direct converter so that the charger to be connected for charging the energy storage cells can advantageously be configured correspondingly with decreased functionality or for lower powers.

Advantageously, no additional components on the part of the battery direct converter system are thus required, which advantageously reduces costs, installation space and weight. Owing to the galvanically isolated coupling, in addition advantageously there is a considerable potential choice of energy sources feeding on the primary side, wherein as a minimum requirement, only a provision of an AC variable for bypassing the galvanic isolation needs to be provided. It is conceivable, for example, to attach the primary-side winding in each case only for one charging operation or to provide said primary-side winding permanently, wherein in the second case, the primary-side winding can remain open during traveling operation.

Owing to the inductor or inductance in the operating circuit of the battery direct converter which is dimensioned for high powers, only a low level of additional complexity in the form of an additional winding needs to be provided in order to provide the galvanically isolated inductive coupling possibility according to the invention.

Although the present invention has been described with reference to preferred exemplary embodiments, it is not restricted to these exemplary embodiments. Therefore, a person skilled in the art will be able to amend the described features of the invention or combine them with one another without departing from the essence of the invention.

LIST OF REFERENCE SYMBOLS

1 Energy storage module
2 Semiconductor switch
3 Energy storage cell
4 Inductance
5 Coupling device
6 Actuation device
7 Motor
8 Capacitor
10 Energy storage device
11 String
20 System

The invention claimed is:

1. A switchable energy storage device (10), comprising: at least two series-connected energy storage modules (1), wherein each energy storage module (1) comprises at least one electrical energy storage cell (3) which is connectable into an operating circuit by a semiconductor switch (2), characterized in that the energy storage device (10) has a galvanically isolated, inductive coupling device (5) for charging the energy storage cells (3); and wherein for the case where no DC link voltage of a capacitor (8) is required during charging, the current is conducted past the capacitor (8) of the energy storage device (10) by an actuation device (6).

2. The energy storage device (10) as claimed in claim 1, characterized in that the coupling device (5) is in the form of a transformer.

3. The energy storage device (10) as claimed in claim 2, characterized in that a primary winding of the transformer is arranged permanently on an inductance (4) in the operating circuit of the energy storage device (10).

4. The energy storage device (10) as claimed in claim 1, characterized in that the semiconductor switches (2) of the energy storage modules (1) perform a rectifying function for the charging current.

5. The energy storage device (10) as claimed in claim 1, characterized in that the semiconductor switches (2) are arranged in the form of a half-bridge circuit.

6. The energy storage device (10) as claimed in claim 1, characterized in that the energy storage device (10) has a variable number of parallel-connected strings (11) comprising series-connected energy storage modules (1).

7. The energy storage device (10) as claimed in claim 6, characterized in that a series inductance (4) is provided for each of the strings (11).

8. The energy storage device (10) as claimed in claim 7, characterized in that the inductance (4) is formed as wiring inductance of the strings (11) or as an additional discrete inductance (4).

9. The energy storage device (10) as claimed in claim 1, characterized in that a primary winding of the coupling device (5) is arranged so as to be spaced apart from a secondary winding of the coupling device (5) separated by an air gap.

10. A method for operating a switchable energy storage device (10) comprising at least two series-connected energy storage modules (1), wherein each energy storage module (1) comprises at least one electrical energy storage cell (3) which can be connected into an operating circuit by a semiconductor switch (2), wherein the energy storage device (10) has a galvanically isolated, inductive coupling device (5), said method comprising the following steps:
  impressing an AC electrical signal onto a primary winding of the coupling device (5);
  switching the semiconductor switches (2), arranged on a secondary side of the coupling device (5), of the energy storage modules (1) in such a way that at least half-cycles of the secondary-side AC signal are used for charging the energy storage cells (3) of the energy storage modules (1); and
  for the case where no DC link voltage of a capacitor (8) is required during charging, the current is conducted past the capacitor (8) of the energy storage device (10) by an actuation device (6).

11. A system (20) comprising a controllable energy storage device (10) as claimed in claim 1, wherein the system (20) further has a charger, wherein energy storage cells (3) of the energy storage device (10) can be charged by means of the charger, wherein the energy storage device (10) performs the functionality of a secondary side of the charger.

12. The system as claimed in claim 11, characterized in that the semiconductor switches (2) of the energy storage device (10) are used as rectifiers of the charger.

13. A computer program product comprising program code means for implementing the method as claimed in claim 10 when said computer program product is executed on an electronic control device or is stored on a computer-readable data storage medium.

14. The energy storage device (10) as claimed in claim 7, characterized in that the inductance (4) is formed as an additional discrete inductance (4).

15. The energy storage device (10) as claimed in claim 2, characterized in that a primary winding of the transformer is arranged removably on an inductance (4) in the operating circuit of the energy storage device (10).

16. The energy storage device (10) as claimed in claim 1, characterized in that the semiconductor switches (2) are arranged in the form of a full-bridge circuit.

* * * * *